No. 743,950. PATENTED NOV. 10, 1903.
R. W. STIMSON & F. McMANIS.
FEED BOX.
APPLICATION FILED FEB. 28, 1903.

NO MODEL.

Witnesses,
Russell A. MacTab
John B. Sherwood

Inventors,
Robert W. Stimson
Fred McManis
By Joseph A. Minturn
Attorney.

THE NORRIS PETERS CO., PHOTO-LITHO., WASHINGTON, D. C.

No. 743,950. Patented November 10, 1903.

UNITED STATES PATENT OFFICE.

ROBERT W. STIMSON AND FRED McMANIS, OF INDIANAPOLIS, INDIANA, ASSIGNORS TO THE CENTURY MANUFACTURING COMPANY, OF INDIANAPOLIS, INDIANA, A CORPORATION OF INDIANA.

FEED-BOX.

SPECIFICATION forming part of Letters Patent No. 743,950, dated November 10, 1903.

Application filed February 28, 1903. Serial No. 145,455. (No model.)

*To all whom it may concern:*

Be it known that we, ROBERT W. STIMSON and FRED MCMANIS, citizens of the United States, residing at Indianapolis, in the county of Marion and State of Indiana, have invented certain new and useful Improvements in Feed-Boxes, of which the following is a specification.

This invention relates to improvements in receptacles for feeding live stock, and is specially adapted to contain the grain or soft feed for a horse.

The object of the invention is to provide a receptacle having a removable partition and cover which when in position in the receptacle form a separate closed compartment in which the feed may be placed out of reach of the animal except as the feed in regulated quantities is fed from the closed compartment into the open one. The object in providing a removable partition and cover is to enable the receptacles to be nested for shipment when the partitions are removed and to enable the partitions to be inserted when oats and other hard grain is fed and to be removed when soft feed is fed.

Another object of the invention is to cheapen the cost of production and to make a seamless and therefore more durable receptacle.

A further and important object of the invention is to provide a receptacle with walls curved in every direction, whereby no corners are produced for the lodgment of the feed and whereby the feed will settle by gravity to the lowest part of the receptacle and there accumulate in a mass easy to be taken up by the animal.

The object of the invention also is to provide an abrupt offset in the bottom of the open compartment adjacent to the partition to act as a drain for the animal's saliva, which would otherwise moisten the feed in the bottom of the closed reservoir and cause it to clog the outlet.

We accomplish these objects by the mechanism illustrated in the accompanying drawings, in which—

Figure 1:
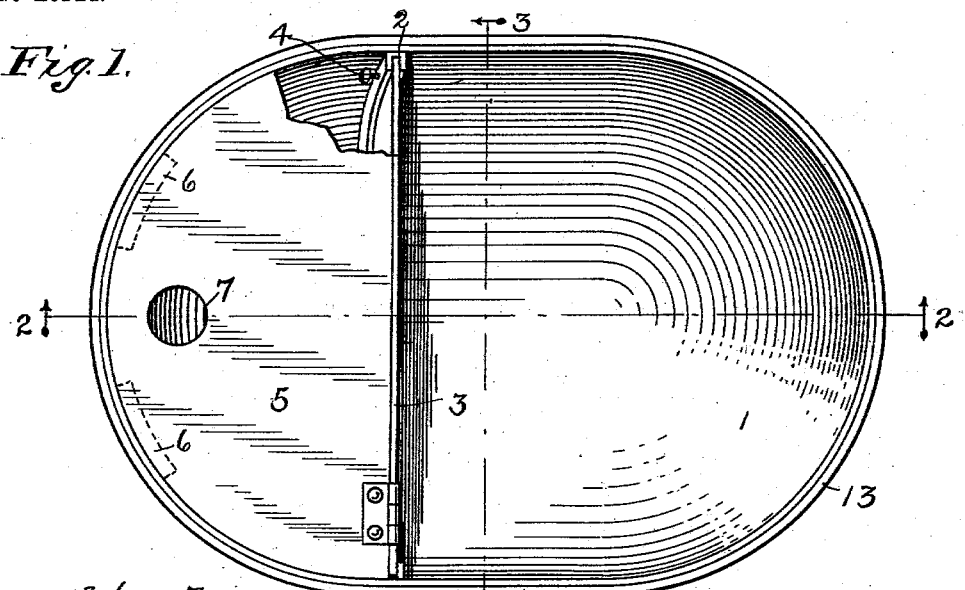
Figure 2:
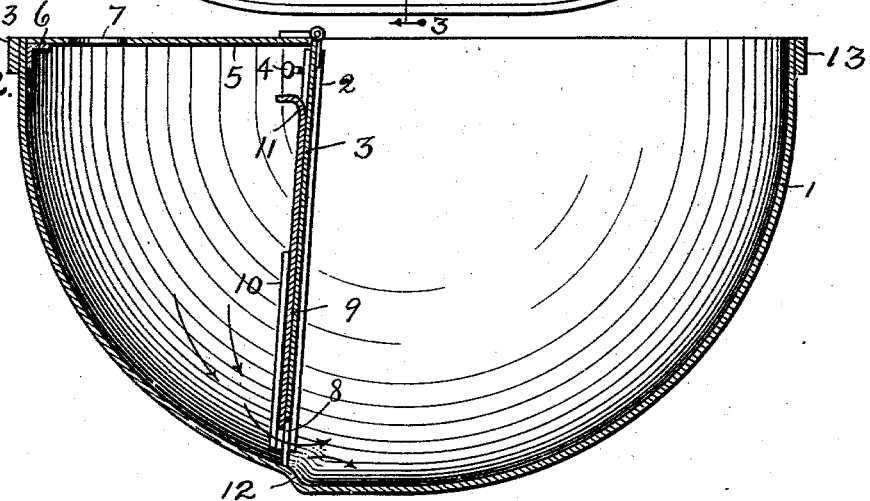
Figure 3:
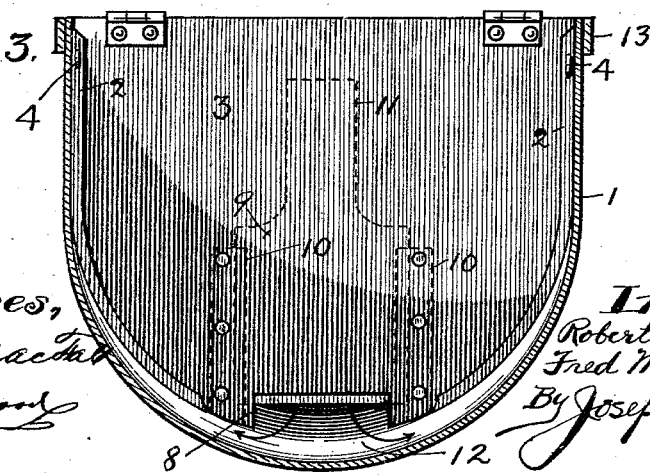

Figure 1 is a top plan view of our improved feed-box with partition and cover in operative position, a portion of the cover being broken away; Fig. 2, a section on the line 2 2 of Fig. 1, and Fig. 3 a section on the line 3 3 of Fig. 1, both views being taken looking in the direction of the arrows associated with the dotted lines.

Like characters of reference indicate like parts throughout the several views of the drawings.

The body 1 of the invention is made from sheet metal which is pressed to shape, thus avoiding all seams, which invariably form the starting-points for corrosion and breakage. The sides for an inch or so down from the rim are elliptical and parallel, but thence to the bottom of the receptacle the walls are curved or rounded to form a cornerless or concave vessel. Soldered, riveted, or otherwise secured to the inner walls of the receptacle are the channel-bars 2, preferably formed by bending a strip of metal to U shape in cross-section. These form holders for the removable partition 3, which is shaped to just fit between the channels at that part of the receptacle. When in place, the partition will be retained by set-screws 4.

Hinged to the partition 3 is the lid or cover 5, which drops down inside of the walls of the receptacle, making a close fit, as shown, and is supported by the stops 6 6, formed from metal angle-bars, which are soldered or riveted to the inner wall of the box. The lid has the perforation 7, by which a finger-hold is obtained in raising the lid. When the partition is removed, the lid of course comes off with it, thus leaving the receptacle free and open.

The partition 3 has the bottom slot 8, which provides a maximum opening for the discharge of oats or other feed which is placed at feeding time in the closed receptacle or compartment. The opening 8 only allows a regulated quantity of the feed to pass into the open compartment to take the place of the mouthful which has just been eaten by the animal. This prevents the horse from wasting his feed. On account of varying conditions in the feed a different size of opening is required under different circumstances, and this regulation is secured by means of a gate 9, which is a plate of metal held and guided by cleats 10 at each side of the slot 8. It is placed inside of the closed compartment and is raised and lowered by the handle-hook 11. Below the outlet 8 the bottom of the receptacle is bent down suddenly to form the offset 12, which makes a depression known as a "slobber-catcher," and which is a drain to receive the saliva of the feeding animal and keep it away from the feed at the hopper-outlet 8. It will be noted that the partition 3 in connection with the rounded and downwardly-sloping walls of the receptacle form a hopper, which causes the feed by gravity to settle toward the outlet 8, and the pocket-like conformation of the bottom of the receptacle bunches the feed, so as to make it easy to take up by the animal.

By removing the partition and cover the receptacles may be used for soft feed or for watering-trough, and by nesting a number of the empty boxes together much space may be saved in storing and shipping them. This will make an important saving in freight rates from factory to consumer and provides a specially desirable feature with race and exhibition horses that are shipped on circuits, where it is desired to take their feed-boxes with them.

The rim of the box will be stiffened and strengthened by the heavy band 13.

Having thus fully described our invention, what we claim as new, and wish to secure by Letters Patent, is—

1. In a feed-box a seamless concave receptacle having channels, a removable partition placed in said channels dividing the receptacle into two compartments, set-screws to removably secure it therein, a cover for one of the compartments hinged to the partition, said partition having a bottom outlet and said receptacle having an offset or depression in its bottom outside of the partition-outlet to form a slobber-catcher, said bottom being curved in every direction toward and merging in said depression.

2. In a feed-box a receptacle having concave walls and inside channel-bars, a removable partition seated in the channels and dividing the receptacle into two compartments, set-screws to secure the partition, a cover for one of the compartments hinged to the partition and removable therewith, said partition having a bottom outlet and an adjustable gate to regulate the size of said outlet, the bottom of said receptacle curving from every direction toward the outlet of the partition.

In witness whereof I, ROBERT W. STIMSON, have hereunto set my hand and seal, at Indianapolis, Indiana, this 7th day of February, A. D. 1903.

ROBERT W. STIMSON. [L. S.]

Witnesses:
JOSEPH A. MINTURN,
JOHN B. SHERWOOD.

In witness whereof I, FRED MCMANIS, have hereunto set my hand and seal, at Charleston, West Virginia, this 9th day of February, A. D. 1903.

FRED MCMANIS. [L. S.]

Witnesses:
JOHN WEHRLE,
GEO. E. THOMAS.